United States Patent
Serebrennikov

(10) Patent No.: US 10,071,617 B1
(45) Date of Patent: Sep. 11, 2018

(54) VEHICLE ROOF SHADE

(71) Applicant: Ford Global Technologies, LLC, Dearborn, MI (US)

(72) Inventor: Michael Serebrennikov, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/451,741

(22) Filed: Mar. 7, 2017

(51) Int. Cl.
*E04B 1/74* (2006.01)
*B60J 7/00* (2006.01)
*B60J 7/057* (2006.01)

(52) U.S. Cl.
CPC ............ *B60J 7/0015* (2013.01); *B60J 7/003* (2013.01); *B60J 7/0573* (2013.01)

(58) Field of Classification Search
CPC ........ B60J 7/0015; B60J 7/003; B60J 7/0573; B60J 1/2063; B60J 1/2077; B60J 3/0243; E06B 2009/405; E06B 9/44
USPC ..... 160/241, 370.22, DIG. 16; 296/219, 214
See application file for complete search history.

(56) References Cited

U.S. PATENT DOCUMENTS

| | | | |
|---|---|---|---|
| 6,282,911 B1 * | 9/2001 | Watanabe | B60H 1/00207 296/208 |
| 6,942,001 B1 * | 9/2005 | Crider | E06B 9/42 160/241 |
| 7,287,811 B2 * | 10/2007 | Sanders | B60J 7/0015 160/265 |
| 7,798,567 B2 * | 9/2010 | Glasl | B60J 7/0015 160/265 |
| 7,814,958 B2 | 10/2010 | Hansen et al. | |
| 8,002,341 B2 | 8/2011 | Hotta et al. | |
| 8,365,799 B2 * | 2/2013 | Harris | H01F 7/0252 160/105 |
| 8,366,187 B2 | 2/2013 | Mihashi | |
| 9,051,773 B2 | 6/2015 | Clephas et al. | |
| 9,221,320 B2 | 12/2015 | Gaertner et al. | |
| 9,238,940 B2 | 1/2016 | Park | |
| 2002/0145310 A1 * | 10/2002 | Schatzler | B60J 7/0015 296/214 |
| 2002/0167202 A1 * | 11/2002 | Pfalzgraf | B60J 7/0015 296/214 |
| 2002/0195843 A1 * | 12/2002 | Glasl | B60J 7/0015 296/214 |
| 2004/0040672 A1 * | 3/2004 | Nagar | B60J 1/2025 160/98 |
| 2004/0119323 A1 * | 6/2004 | Leenders | B60J 7/003 296/214 |
| 2004/0226669 A1 * | 11/2004 | Webb | E06B 9/44 160/299 |
| 2005/0051285 A1 * | 3/2005 | Yano | B60J 1/2027 160/370.22 |

(Continued)

FOREIGN PATENT DOCUMENTS

| | | |
|---|---|---|
| DE | 19538551 C1 | 10/1995 |
| WO | 2005068236 A2 | 7/2005 |

*Primary Examiner* — Brian D Mattei
(74) *Attorney, Agent, or Firm* — Jason Rogers; Price Heneveld LLP

(57) ABSTRACT

A vehicle includes a first roller having a first roller magnet and a second roller having a second roller magnet. A shade includes a first shade magnet and a second shade magnet. At least one of the first and second shade magnets are coupled to at least one of the first and second roller magnets.

13 Claims, 7 Drawing Sheets

(56) References Cited

U.S. PATENT DOCUMENTS

| | | | |
|---|---|---|---|
| 2006/0022484 A1* | 2/2006 | Su | B60J 1/2063 |
| | | | 296/138 |
| 2006/0082192 A1 | 4/2006 | Dubay et al. | |
| 2007/0267898 A1* | 11/2007 | Lin | B60J 7/0015 |
| | | | 296/214 |
| 2007/0278818 A1* | 12/2007 | Koelbl | B60J 1/2016 |
| | | | 296/143 |
| 2008/0036245 A1* | 2/2008 | Koelbl | B60J 7/0015 |
| | | | 296/214 |
| 2010/0148540 A1* | 6/2010 | Hotta | B60J 7/0015 |
| | | | 296/215 |
| 2011/0042996 A1* | 2/2011 | Demma | B60J 1/2063 |
| | | | 296/98 |
| 2011/0067826 A1* | 3/2011 | Uehara | B60J 7/0015 |
| | | | 160/314 |
| 2011/0204682 A1 | 8/2011 | Kamei et al. | |
| 2012/0091763 A1* | 4/2012 | Mihashi | B60J 7/0015 |
| | | | 296/216.08 |
| 2012/0098301 A1* | 4/2012 | Nakamura | B60J 7/0015 |
| | | | 296/219 |
| 2013/0049409 A1* | 2/2013 | Stark | B60J 7/0015 |
| | | | 296/219 |
| 2013/0341972 A1 | 12/2013 | Choi et al. | |
| 2014/0097636 A1* | 4/2014 | Snider | B60J 1/001 |
| | | | 296/97.8 |
| 2015/0075737 A1* | 3/2015 | Gaertner | B60J 7/0015 |
| | | | 160/370.22 |
| 2017/0225549 A1* | 8/2017 | Kanai | B60J 7/0015 |

* cited by examiner

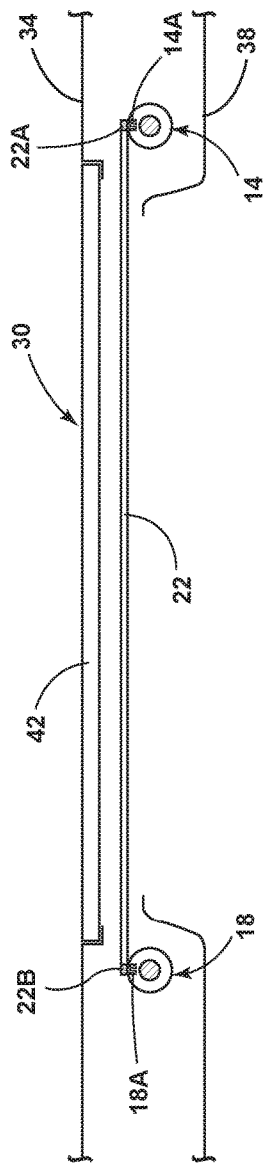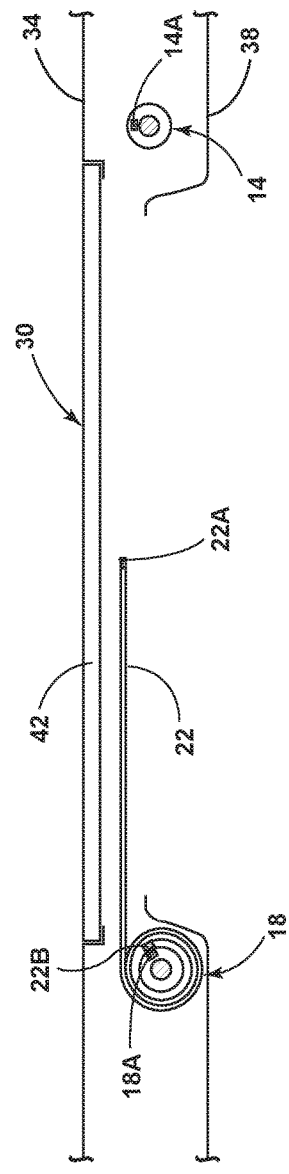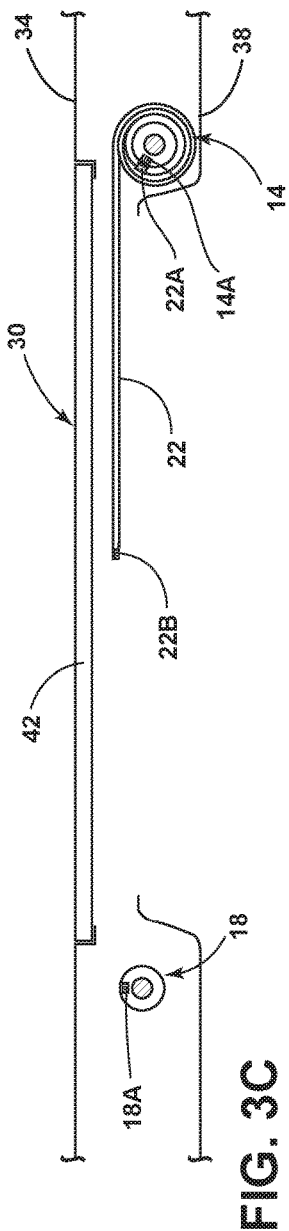
FIG. 3A
FIG. 3B
FIG. 3C

VEHICLE ROOF SHADE

FIELD OF THE INVENTION

The present disclosure generally relates to vehicle shades, and more particularly, to vehicle moonroof and sunroof shades.

BACKGROUND OF THE INVENTION

Moonroofs and sunroofs of a vehicle may allow ambient illumination (e.g., from the sun) to enter through an opening in a roof. Some passengers of vehicle may want illumination while others do not. Accordingly, incorporating shades in moonroofs and sunroofs may be advantageous.

SUMMARY OF THE INVENTION

According to one aspect of the present disclosure, a vehicle includes a first roller having a first roller magnet and a second roller having a second roller magnet. A shade includes a first shade magnet and a second shade magnet. At least one of the first and second shade magnets are coupled to at least one of the first and second roller magnets.

According to another aspect of the present disclosure, a vehicle includes a first roller having a first roller magnet. A second roller includes a second roller magnet. A track assembly is positioned proximate the rollers. A shade is slidably coupled with the track assembly and includes a first shade magnet and a second shade magnet. At least one of the first and second shade magnets are coupled to at least one of the first and second roller magnets.

According to yet another aspect of the present disclosure, a method of operating a roof shade includes the steps: coupling a first and a second roller magnet within a first and a second roller with a first and a second shade magnet within a shade; decoupling one of the first and second roller magnets from one of the first and second shade magnets; and rotating at least one of the first and second rollers.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 3A is schematic cross-sectional view taken at line IIIA of FIG. 1A, according to at least one example;

FIG. 3B is schematic cross-sectional view taken at line IIIB of FIG. 1A, according to at least one example;

FIG. 3C is schematic cross-sectional view taken at line IIIC of FIG. 1A, according to at least one example;

DETAILED DESCRIPTION OF THE PREFERRED EMBODIMENTS

Figure 1A:
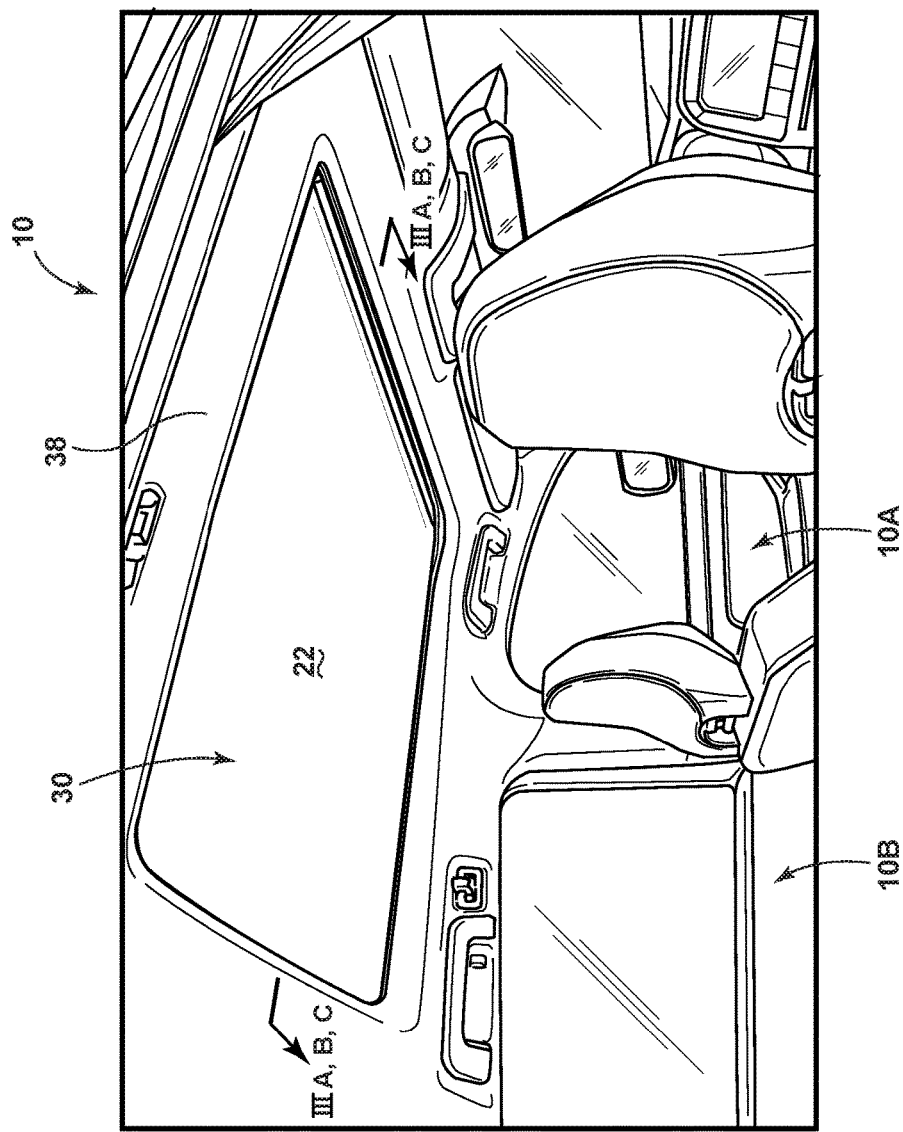
FIG. 1A is a perspective view of an interior of a vehicle, according to at least one example.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

Referring now to FIGS. 1A-5, reference numeral 10 generally designates a vehicle. The vehicle 10 includes a first roller 14 and a first roller magnet 14A. A second roller 18 includes a second roller magnet 18A. A shade 22 includes a first shade magnet 22A and a second shade magnet 22B. At least one of the first and second shade magnets 22A, 22B are coupled to at least one of the first and second roller magnets 14A, 18A.

Figure 1B:
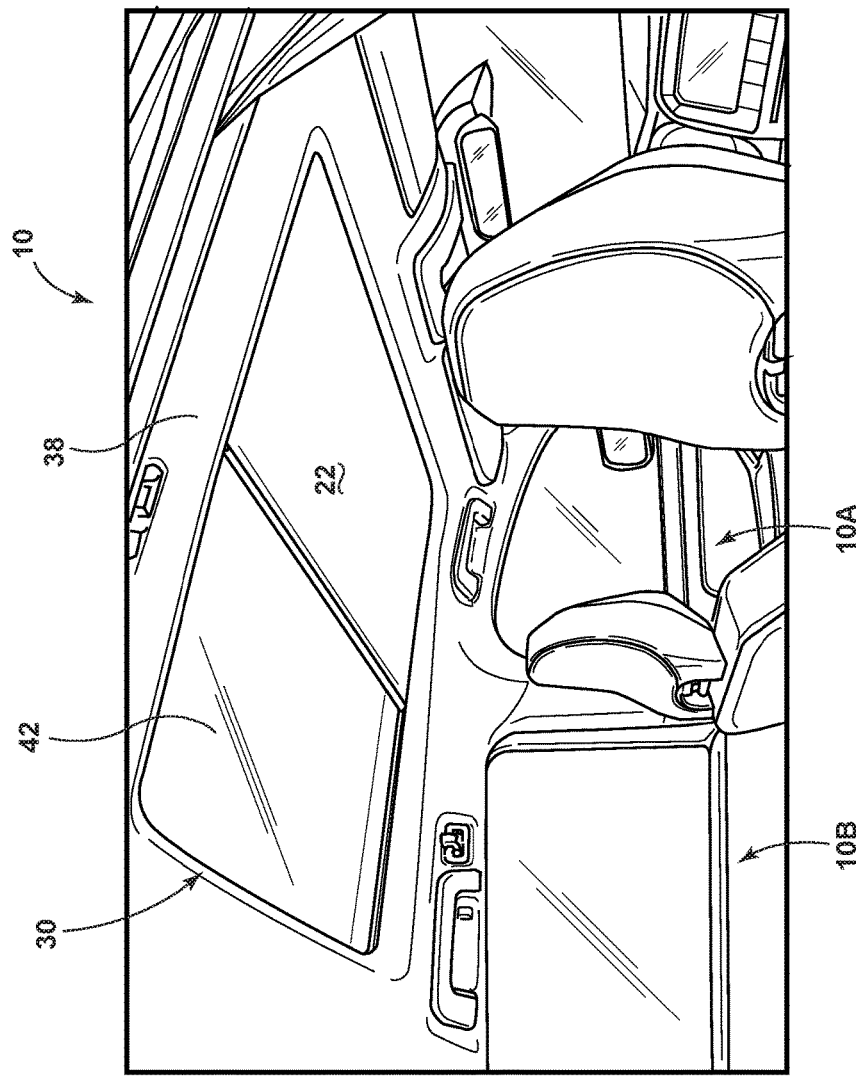
FIG. 1B is a perspective view of an interior of a vehicle, according to at least one example.
Figure 1C:
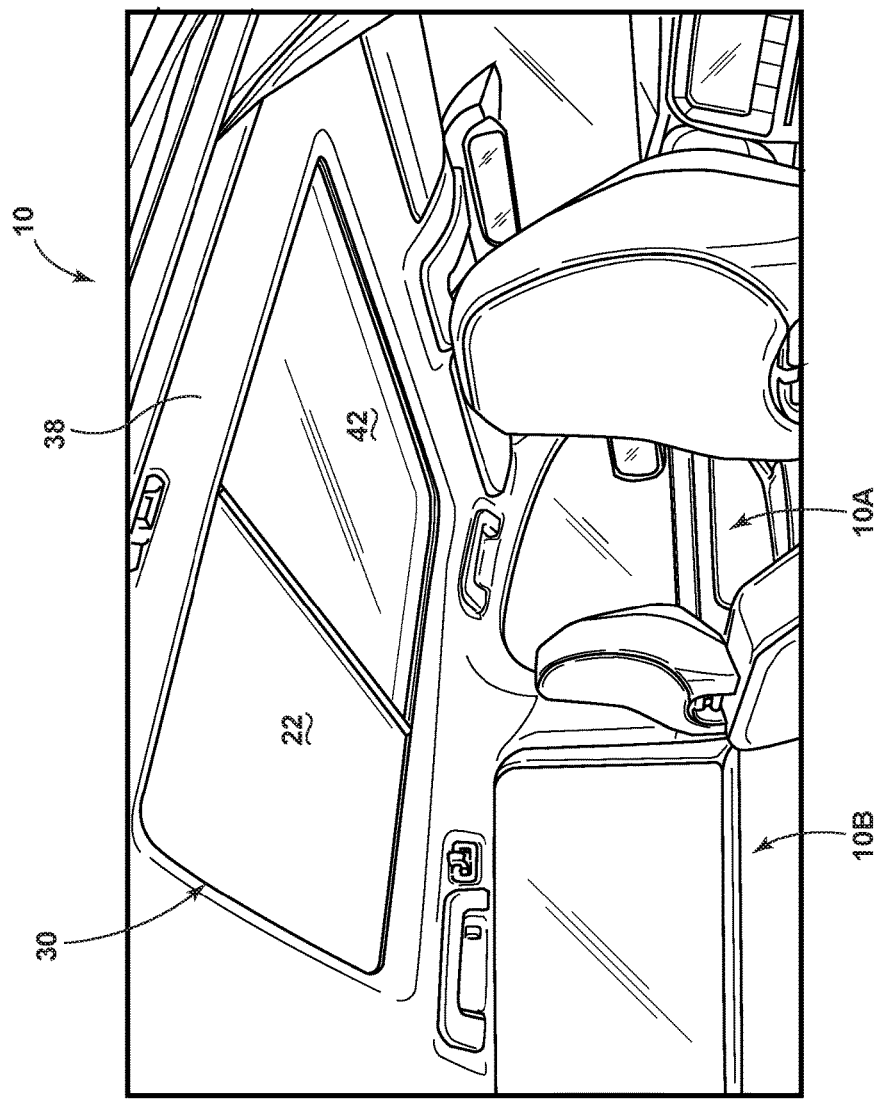
FIG. 1C is a perspective view of an interior of a vehicle, according to at least one example.
Figure 2:
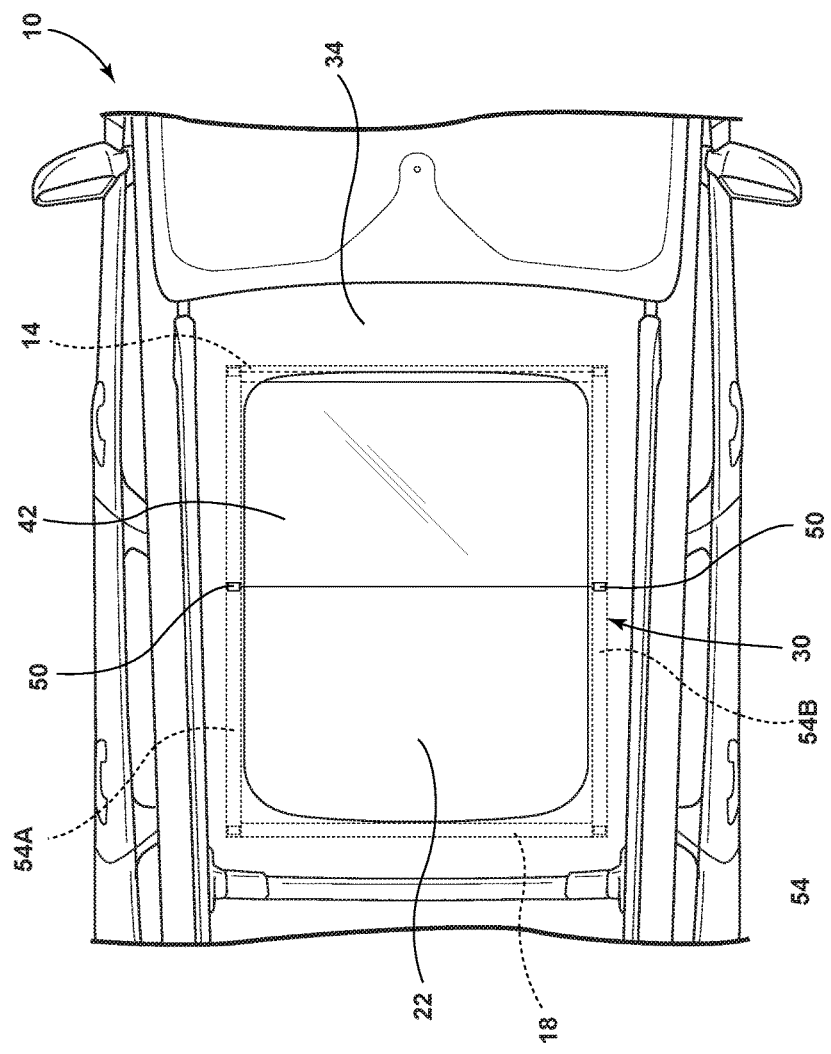
FIG. 2 is a top view of a moonroof of a vehicle, according to at least one example.

Referring now to FIGS. 1A-2, the vehicle 10 includes a moonroof 30. It will be understood that although the disclosure is described in connection to the moonroof 30, the disclosure may equally be applied to sunroofs and/or other transparencies (e.g., side windows and/or a rear window) located around the vehicle 10. The moonroof 30 is positioned, and disposed through, a roof 34 and a headliner 38 of the vehicle 10. The moonroof 30 includes the shade 22 and a transparency 42. The transparency 42 is positioned proximate the shade 22. The transparency 42 may be formed of an optically transparent and/or translucent material. For example, the transparency 42 may be formed of a polymeric material and/or a glass based material. According to various examples, the transparency 42 may be tinted or colored. The transparency 42 may be operably coupled with one or more motors and actuation systems such that the transparency 42 may slide in vehicle forward, rearward, and side to side directions. Further, the transparency 42 may be moved in vehicle inboard and/or outboard directions.

The shade 22 of the moonroof 30 is operable between a plurality of states to allow ambient light from around the vehicle 10 to enter an interior of the vehicle 10. For example, the shade 22 may be operable between a fully closed state (FIG. 1A), a fully open state, a front open state (FIG. 1C) and a rear open state (FIG. 1B). It will be understood that the shade 22 may be positioned at all states therebetween without departing from the teachings provided herein. In the fully open state, the shade 22 may be retracted in either a vehicle forward and/or vehicle rearward direction such that the entirety of the transparency 42 is visible. As such, ambient light from around the vehicle 10 may enter both a front interior 10A and a rear interior 10B of the vehicle 10. In the fully closed state, the shade 22 may reduce or eliminate the entrance of ambient light into the interior of the vehicle 10. In the front open state, the shade 22 may be retracted about half way toward a rear of the vehicle 10. As such, ambient light may pass through about half of the transparency 42 and into the front interior 10A of the vehicle 10. In the rear open state, the shade 22 may be retracted about half way toward a front of the vehicle 10. As such, ambient light may pass through about half of the transparency 42 and into the rear interior 10B of the vehicle 10.

The shade 22 may be configured to reduce and/or eliminate light transmitting through the moonroof 30. For example, the shade 22 may be configured to transmit less than or equal to about 90%, 80%, 70%, 60%, 50%, 40%, 30%, 20%, 10% or less than or equal to about 1% of light through the moonroof 30. The shade 22 may be composed of a cloth and/or a polymeric material. According to various examples, the shade 22 may be composed of a mesh. As will be explained in greater detail below, the shade 22 may be flexible such that the shade 22 may be wound or rolled onto the first and/or second rollers 14, 18. The shade 22 may include one or a plurality of guide wires configured to maintain a predetermined, or desired, amount of tension within the shade 22. The shade 22 may include a plurality of attachment features 50. The attachment features 50 may be positioned at corners and/or ends of the shade 22. According to various examples, the attachment features 50 may be rollers or other coupling features to couple the shade 22 to a track assembly 54.

The moonroof 30 may include the track assembly 54. In the depicted example, the track assembly 54 includes a driver side portion 54A and a passenger side portion 54B. It will be understood that the track assembly 54 may take a variety of configurations without departing from the teachings provided herein. The track assembly 54 may extend a portion, a majority or an entirety of a length of the moonroof 30. The shade 22 is slidably coupled with the track assembly 54 via the attachment features 50. The slidable coupling between the shade 22 and the track assembly 54 may allow the shade 22 to move between the fully closed, fully open, front open and rear open states. The track assembly 54 is positioned proximate the first and second rollers 14, 18.

Referring now to FIGS. 2-3C, the first and second rollers 14, 18 are positioned at ends of the track assembly 54. The first and second rollers 14, 18 may be coupled to the shade 22 and/or the track assembly 54. The first and second rollers 14, 18 may be positioned between the headliner 38 and the roof 34 to conceal the first and second rollers 14, 18 from view. The first and second rollers 14, 18 are configured to draw, wind, roll-up and/or retract the shade 22 in either a vehicle forward or vehicle rearward direction. The first and second rollers 14, 18 may be operably coupled with one or more motors and/or actuators which are configured to axially rotate the first and second rollers 14, 18. As explained above, the first and second rollers 14, 18 include the first and second roller magnets 14A, 18A, respectively. Each of the first and second rollers 14, 18 may include a plurality of the first and second roller magnets 14A, 18A. The first and second roller magnets 14A, 18A may be positioned within or on an exterior of the first and second rollers 14, 18. In examples where each of the first and second rollers 14, 18 include a single roller magnet 14A, 18A, the roller magnets 14A, 18A may extend around a portion, a majority or an entirety of the first and second rollers 14, 18. In examples where each of the first and second rollers 14, 18 include a plurality of roller magnets 14A, 18A, the roller magnets 14A, 18A may be evenly spaced or grouped around the first and second rollers 14, 18. The first and second roller magnets 14A, 18A may extend a portion, a majority or an entirety on a length of the first and second rollers 14, 18.

The first and second roller magnets 14A, 18A may be permanent magnets, electromagnets and/or other magnetic structures. In permanent magnet examples, the first and second roller magnets 14A, 18A may include iron, nickel, iron alloy, nickel alloy, alnico alloy, bismanol alloy, permalloy, magnetite, ferromagnetic rare earth alloys and/or combinations thereof. In electromagnet examples, the first and second roller magnets 14A, 18A may include windings and/or other structures configured to produce an electromagnetic field upon the application of electrical energy. In such electromagnet examples, the first and/or second roller magnets 14A, 18A may be coupled with a power source. According to various examples, at least one of the first and second roller magnets 14A, 18A is an electromagnet. It will be understood that the first and second roller magnets 14A, 18A may be the same or different from one another. In a first example, the first and second roller magnets 14A, 18A may both be permanent magnets with different compositions. In a second example, the first roller magnet 14A may be a permanent magnet and the second roller magnet 18A may be an electromagnet. The first and second roller magnets 14A, 18A may each be configured to emit a different strength magnetic field.

The shade 22 includes the first shade magnet 22A and the second shade magnet 22B. The first and second shade magnets 22A, 22B may each be positioned at a perimeter, or in a center of the shade 22. The first and second shade magnets 22A, 22B may be positioned at opposite ends of the shade 22. For example, the first and second shade magnets 22A, 22B are positioned proximate ends of the shade 22. In examples where the first and second shade magnets 22A, 22B are positioned proximate ends of the shade 22, the first and second shade magnets 22A, 22B may be proximate vehicle forward and vehicle rearward ends of the shade 22. The first and second shade magnets 22A, 22B may be positioned on the shade 22 (e.g., on a surface thereof) or within the shade 22 (e.g., to conceal the magnets 22A, 22B). The first and second shade magnets 22A, 22B may be positioned across a portion, a majority and/or an entirety of the ends of the shade 22. The shade 22 may include a single or a plurality of the first and second shade magnets 22A, 22B. For example, a plurality of first shade magnets 22A may be disposed across a vehicle forward end of the shade 22, or a single continuous first shade magnet 22A may be present. Further, a plurality of second shade magnets 22B may be disposed across a vehicle rearward end of the shade 22, or a single continuous second shade magnet 22B may be present.

The first and second shade magnets 22A, 22B may be permanent magnets, electromagnets and/or other magnetic structures. In permanent magnet examples, the first and second shade magnets 22A, 22B may include iron, nickel, iron alloy, nickel alloy, alnico alloy, bismanol alloy, permalloy, magnetite, ferromagnetic rare earth alloys and/or combinations thereof. In electromagnet examples, the first and second shade magnets 22A, 22B may include windings and/or other structures configured to produce an electromagnetic field. In such electromagnet examples, the first and/or second shade magnets 22A, 22B may be coupled with a power source (e.g., through the attachment features 50). It will be understood that the first and second shade magnets 22A, 22B may be the same or different from one another. In a first example, the first and second shade magnets 22A, 22B may both be permanent magnets with different compositions. In a second example, the first shade magnet 22A may be a permanent magnet and the second shade magnet 22B may be an electromagnet. It will be understood that although described as magnets, the first and second shade magnets 22A, 22B may simply be a ferrous or magnetic containing material which is attractable by electromagnet examples of the first and second roller magnets 14A, 18A. The first and second shade magnets 22A, 22B may each be configured to emit a different strength magnetic field. The coupling of the first and second shade magnets 22A, 22B with the first and second roller magnets 14A, 18A provides an attractive, or a retention, force between the shade 22 and the first and second rollers 14, 18.

Referring now to FIGS. 3A-C, in operation, at least one of the first and second shade magnets 22A, 22B is magnetically coupled to at least one of the first and second roller magnets 14A, 18A. In the fully closed position, both the first and second shade magnets 22A, 22B are coupled to the first and second roller magnets 14A, 18A. Coupling of the first and second shade magnets 22A, 22B to the first and second roller magnets 14A, 18A may hold the shade 22 in the closed position (FIG. 3A) and may generate a desired or predetermined amount of rigidity or tension within the shade 22. To transition the shade 22 into the front open state (FIG. 3B) and/or the fully open state, the first shade magnet 22A is magnetically decoupled from the first roller magnet 14A. For example, in electromagnet examples of the first roller magnet 14A, the magnetic field from the first roller magnet 14A may be deactivated by the removal of electrical energy from the first roller magnet 14A. Once the first roller magnet 14A and the first shade magnet 22A are decoupled, the second roller 18 may rotate in a vehicle rearward direction to retract the shade 22 to the front open state and/or the fully open state. In other words, the second roller magnet 18A remains coupled to the second shade magnet 22B such that rotation of the second roller 18 rolls the shade 22 onto the second roller 18.

To transition the shade 22 into the rear open state (FIG. 3C) and/or the fully open state, the second shade magnet 22B is magnetically decoupled from the second roller magnet 18A. For example, in electromagnet examples of the second roller magnet 18A, the magnetic field from the second roller magnet 18A may be deactivated. Once the second roller magnet 18A and the second shade magnet 22B are decoupled, the first roller 14 may rotate in a vehicle forward direction to retract the shade 22 in a vehicle forward direction to the rear open state and/or the fully open state.

It will be understood that the decoupling of the first and/or second shade magnets 22A, 22B from at least one of the first and second roller magnets 14A, 18A may be accomplished by moving the magnets away from one another to result in the decoupling. For example, the first and second shade magnets 22A, 22B and the first roller magnet 14A may be permanent magnets and the second roller magnet 18A may be an electromagnet. In such an example, the magnetic field generated by the second roller magnet 18A may be increased to a magnitude greater than that produced by the first roller magnet 14A. As a result of the relatively greater coupling between the second shade magnet 22B and the second roller magnet 18A, the rotation of the second roller 18 may cause the first shade magnet 22A to decouple from the first roller magnet 14A as the shade 22 is drawn in a vehicle rearward direction.

Figure 4:
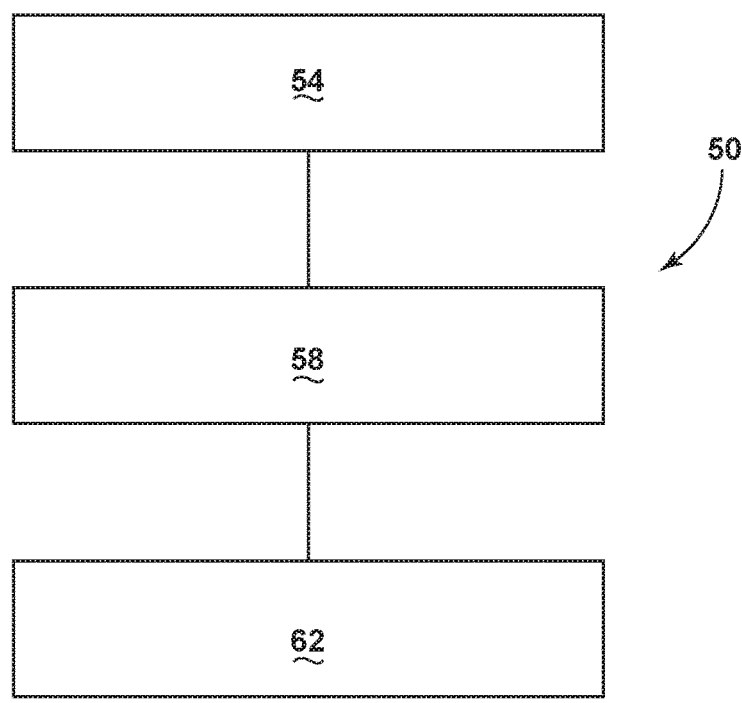
FIG. 4 is an exemplary flow chart of operating the moonroof.

Referring now to FIG. 4, an exemplary method 50 of operating the moonroof 30 is provided. The method 50 may begin with a step 54 of coupling the first and second roller magnets 14A, 18A within the first and second rollers 14, 18 with the first and second shade magnets 22A, 22B. In permanent magnet examples, the shade magnets 22A, 22B and the roller magnets 14A, 18A may be placed proximately to each other such that the magnetic fields generate an attractive force. In electromagnet examples, coupling may include providing power to the first and second roller magnets 14A, 18A such that magnetic fields are generated which attract the first and second shade magnets 22A, 22B, respectively.

Next, a step 58 of decoupling one of the first and second roller magnets 14A, 18A from the first and second shade magnets 22A, 22B is performed. As explained above, decoupling of one of the first and second roller magnets 14A, 18A from the first and second shade magnets 22A, 22B may be accomplished by removing an electrical power to electromagnet examples of the first and second roller magnets 14A, 18A. Further, decoupling may be accomplished by separating the first and second shade magnets 22A, 22B from the first and second roller magnets 14A, 18A.

Next, a step 62 of rotating at least one of the first and second rollers 14, 18 is performed. As explained above, rotation of the first or second rollers 14, 18 may cause the shade 22 to transition between states by winding the shade 22 around and over one of the first and second rollers 14, 18. The method 50 may further include a step of powering at least one of the first and second roller magnets 14A, 18A. The step of powering at least one of the first and second roller magnets 14A, 18A may be performed in electromagnet examples of the first and second roller magnets 14A, 18A. The method 50 may further include a step of rolling the shade 22 onto one of the first and second rollers 14, 18. As explained above, rolling the shade 22 onto the first and/or second rollers 14, 18 may move the shade 22 between the different states. The method 50 may further include a step of moving the shade 22 in a vehicle forward direction. The method 50 may further include a step of moving the shade 22 in a vehicle rearward direction.

Figure 5:
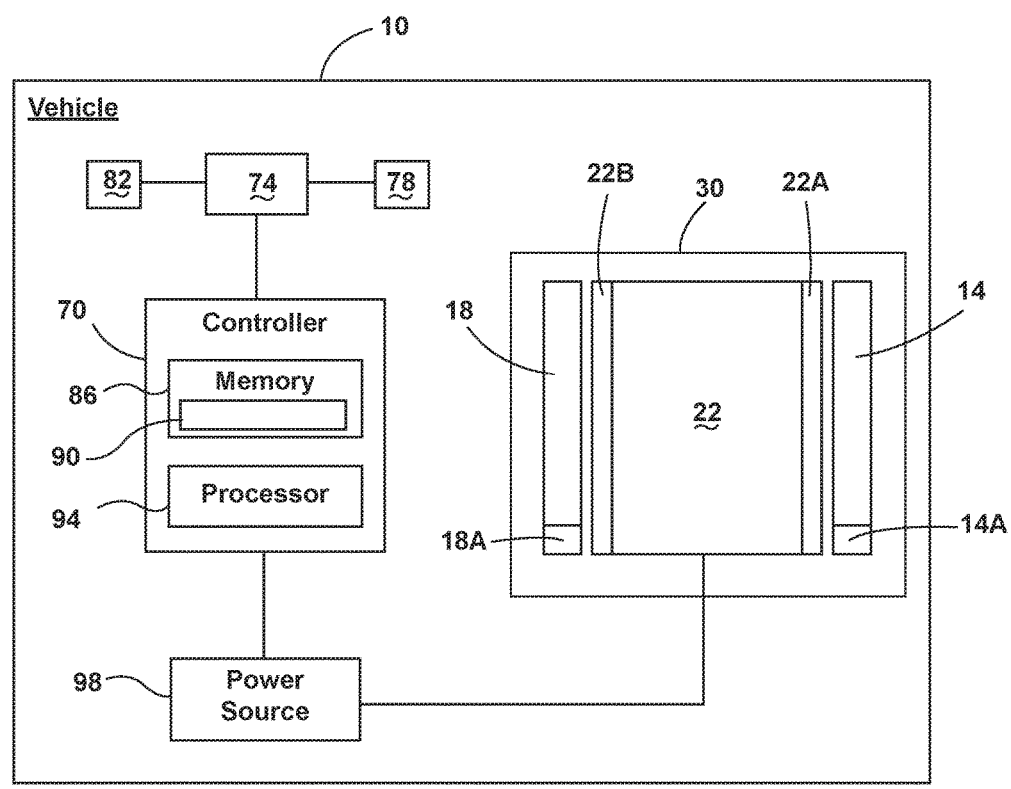
FIG. 5 is a block diagram of the vehicle.

Referring now to FIG. 5, depicted is a block diagram of the vehicle 10 in which the moonroof 30 is implemented. The vehicle 10 includes a controller 70 in communication with one or more vehicle control modules 74. The vehicle control module 74 may be configured to relay information to the controller 70 from a variety of sensors and/or switches. According to at least one example, the sensors may include an ambient light sensor 78 (e.g., a day/night sensor) configured to detect ambient light exterior or within the interior of the vehicle 10. The vehicle control module 74 may also be coupled with one or more switch 82. The switch 82 may be physical (e.g., mechanical) and/or provided on a touch screen display. In examples where the vehicle 10 includes multiple switches 82, each region (e.g., the front and rear interiors 10A, 10B) may include a switch 82 to control the state of the shade 22 of the moonroof 30.

The controller 70 may include a memory 86 having a moonroof control routine 90 contained therein that is executed by a processor 94 of the controller 70. The controller 70 may provide electrical power to the moonroof 30 via a power source 98 located onboard the vehicle 10. The moonroof control routine 90 may be configured to control a variety of aspects of the moonroof 30. In a first example, the routine 90 may function to move the shade 22 between the fully closed, fully open, front open and rear open states. For example, the routine 90 may be configured to move the shade 22 between the states based on data from the ambient light sensor 78 and/or switch 82. In such an example, the shade 22 may be moved to block or allow light into the different interior regions of the vehicle 10.

In a second example, the routine 90 may be configured to adjust an amount of electrical energy supplied to the first and second roller magnets 14A, 18A. For example, by supplying and/or removing electrical energy, the first and/or second roller magnets 14A, 18A may be coupled and/or decoupled from at least one of the first and second shade magnets 22A, 22B. As explained above, decoupling of the first and/or second roller magnets 14A, 18A from at least one of the first and second shade magnets 22A, 22B may allow one of the first and second rollers 14, 18 to roll up the shade 22. It will be understood that the power source 98 may also be configured to supply electrical energy to motors and/or actuators of the first and second rollers 14, 18.

Use of the present disclosure may offer a variety of advantages. First, the presently disclosed moonroof 30 allows the shade 22 to take a variety of states. Through the variety of states offered by the shade 22, the amount of light entering the front interior 10A and/or the rear interior 10B of the vehicle 10 may be independently controlled to satisfy the preferences of multiple vehicle occupants. Second, use of the first and second rollers 14, 18 and the first and second roller magnets 14A, 18A allows the shade 22 to be retracted in both vehicle forward and vehicle rearward directions.

According to various embodiments, a vehicle includes a first roller including a first roller magnet. A second roller includes a second roller magnet. A shade includes a first shade magnet and a second shade magnet. At least one of the first and second shade magnets are coupled to at least one of the first and second roller magnets. Embodiments of the vehicle can include any one or a combination of the following features:
  a power source coupled to at least one of the first and second roller magnets;
  at least one of the first and second roller magnets is an electromagnet;
  a track assembly proximate the first and second rollers;
  the shade is slidably coupled with the track assembly;
  the first and second shade magnets are positioned proximate ends of the shade;
  the first and second shade magnets are positioned proximate vehicle forward and vehicle rearward ends of the shade;
  the first and second shade magnets are permanent magnets; and/or
  a transparency positioned proximate the shade.

According to various embodiments, a method includes steps of: coupling a first and a second roller magnet within a first and a second roller with a first and a second shade magnet within a shade; decoupling one of the first and second magnets from one of the first and second shade magnets; and rotating at least one of the first and second rollers. Embodiments of the method can include any one or a combination of the following features:
  rolling the shade onto at least one of the first and second rollers;
  moving the shade in a vehicle forward direction; and/or
  moving the shade in a vehicle rearward direction.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

It will be apparent to those skilled in the art that various modifications and variations can be made to the present disclosure without departing from the spirit and scope of the disclosure. Thus, it is intended that the present disclosure cover such modifications and variations provided they come within the scope of the appended claims and their equivalents. Example embodiments include the following.

What is claimed is:

1. A vehicle, comprising:
  a first roller comprising a first electromagnet;
  a second roller comprising a second electromagnet;
  a power source coupled to at least one of the first and second electromagnets; and
  a shade comprising first and second permanent magnets, wherein at least one of the first and second permanent magnets are coupled to at least one of the first and second electromagnets.

2. The vehicle of claim 1, further comprising:
  a track assembly proximate the first and second rollers.

3. The vehicle of claim 2, wherein the shade is slidably coupled with the track assembly.

4. The vehicle of claim 1, wherein the first and second permanent magnets are positioned proximate ends of the shade.

5. The vehicle of claim 1, wherein the first and second permanent magnets are positioned proximate vehicle forward and vehicle rearward ends of the shade.

6. The vehicle of claim 1, further comprising:
a transparency positioned proximate the shade.

7. A vehicle, comprising:
a first roller comprising a first electromagnet;
a second roller comprising a second electromagnet;
a power source coupled to at least one of the electromagnets;
a track assembly positioned proximate the rollers; and
a shade slidably coupled with the track assembly comprising first and second permanent magnets, wherein at least one of the first and second permanent magnets are coupled to at least one of the first and second electromagnets.

8. The vehicle of claim 7, wherein the first and second permanent magnets are positioned proximate ends of the shade.

9. The vehicle of claim 7, wherein the first and second permanent magnets are positioned proximate vehicle forward and vehicle rearward ends of the shade.

10. A method of operating a roof shade, comprising the steps:
coupling a first and a second electromagnet within a first and a second roller with a first and second permanent magnet within a shade;
powering one of the first and second electromagnets;
decoupling one of the first and second electromagnet from one of the first and second permanent magnets; and
rotating at least one of the first and second rollers.

11. The method of claim 10, further comprising the step:
rolling the shade onto at least one of the first and second rollers.

12. The method of claim 10, further comprising the step:
moving the shade in a vehicle forward direction.

13. The method of claim 10, further comprising the step:
moving the shade in a vehicle rearward direction.

* * * * *